(12) United States Patent
Kimoto

(10) Patent No.: US 8,588,293 B2
(45) Date of Patent: Nov. 19, 2013

(54) MOVING IMAGE DATA DISTRIBUTION SYSTEM, ITS METHOD, AND ITS PROGRAM

(75) Inventor: Takahiro Kimoto, Tokyo (JP)

(73) Assignee: NEC Corporation, Tokyo (JP)

( * ) Notice: Subject to any disclaimer, the term of this patent is extended or adjusted under 35 U.S.C. 154(b) by 381 days.

(21) Appl. No.: 12/671,526

(22) PCT Filed: Aug. 1, 2008

(86) PCT No.: PCT/JP2008/063891
§ 371 (c)(1),
(2), (4) Date: Feb. 1, 2010

(87) PCT Pub. No.: WO2009/017229
PCT Pub. Date: Feb. 5, 2009

(65) Prior Publication Data
US 2011/0211631 A1    Sep. 1, 2011

(30) Foreign Application Priority Data

Aug. 1, 2007  (JP) ................................. 2007-200932

(51) Int. Cl.
*H04N 7/26* (2006.01)

(52) U.S. Cl.
USPC .......................................... 375/240.01; 726/6

(58) Field of Classification Search
None
See application file for complete search history.

(56) References Cited

U.S. PATENT DOCUMENTS 6,215,766 B1 *  4/2001  Ammar et al. ................. 370/229
6,891,799 B1 *  5/2005  Hagai et al. .................... 370/235

(Continued)

FOREIGN PATENT DOCUMENTS

JP    2002223441 A    8/2002
JP    2002344399 A    11/2002

(Continued)

OTHER PUBLICATIONS

International Search Report for PCT/JP2008/063891 mailed Sep. 2, 2008.

(Continued)

*Primary Examiner* — Christopher S Kelley
*Assistant Examiner* — Mohammed Jebari

(57) ABSTRACT

A moving image data distribution system for distributing reproduction content data that is hierarchically structured so that lower layer data is synthesized with upper layer data to form high quality data. The moving image data distribution system includes a transmitting apparatus and a receiving apparatus. The transmitting apparatus includes a transmission data storing unit that stores the reproduction content data, an upper layer first data length determining means for determining a data length of the upper layer first data based on a reproduction delay time from when the receiving apparatus receives only the upper layer data to when the receiving apparatus reproduces the reproduction contents, an upper layer first data transmitting means for reading upper layer first data determined based on the upper layer first data length from the storing unit, and transmitting the upper layer first data to the receiving apparatus, and an upper layer subsequent data transmitting means for reading upper layer subsequent data subsequent to the upper layer first data from the storing unit, and transmitting the upper layer subsequent data to the receiving apparatus. The receiving apparatus includes a lower layer data storing unit that stores the lower layer data, a hierarchical data synthesizing means for synthesizing the lower layer data with the upper layer first data or the upper layer subsequent data, and a reproducing means for reproducing high quality data synthesized by the hierarchical data synthesizing means.

15 Claims, 8 Drawing Sheets

(56) References Cited

U.S. PATENT DOCUMENTS

| | | |
|---|---|---|
| 2004/0049793 A1 | 3/2004 | Chou |
| 2004/0052371 A1* | 3/2004 | Watanabe ............... 380/233 |
| 2004/0196972 A1* | 10/2004 | Zhu et al. ............... 380/45 |
| 2005/0166245 A1 | 7/2005 | Shin et al. |
| 2006/0123445 A1 | 6/2006 | Sullivan et al. |

FOREIGN PATENT DOCUMENTS

| | | |
|---|---|---|
| JP | 2004023667 A | 1/2004 |
| JP | 2004297117 A | 10/2004 |
| JP | 2004312740 A | 11/2004 |
| JP | 2004535633 A | 11/2004 |
| JP | 2006518117 A | 8/2006 |
| JP | 2007006443 A | 1/2007 |
| JP | 2007013675 A | 1/2007 |
| JP | 2007036666 A | 2/2007 |
| WO | 0035201 A1 | 6/2000 |
| WO | 2005074277 A1 | 8/2005 |

OTHER PUBLICATIONS

European search report for EP08792104.5 date on Sep. 7, 2012.

Zhi-Jin Wang et al: "Receiver-Buffer-Driven Layered Quality Adaptation for Multimedia Streaming", Signals, Systems and Computers, 2005. Conference Record of the Thirty-Ninth Asilomar Conference on, Pacific Grove, California Oct. 28-Nov. 1, IEEE, Piscataway, NJ, USA, Oct. 28, 2005 (2805-18-28).

Yonghee Lee et al: "Reducing IPTV Channel Switching Time using H.264 Scalable Video Coding", Electrical Engineering, 2008. ICEE 2088. Second International Conference on, IEEE, Piscataway, NJ, USA, Mar. 25, 2008.

Jie Huang et al: "Adaptive live video streaming by priority drop", Advanced Video and Signal Based Surveillance, 2003. Proceedings. IEEE Conference on Jul. 21-22, 2003, Piscataway, NJ, USA,IEEE, Jul. 21, 2003.

Cuetos de P et al: "Adaptive Rate Control for Streaming Stored Fine-Grained Scalable Video", Proceedings of the 12th. International Workshop on Network and Operating Systems Support for Digital Audio and Video. Nossdav 2002. Miami, FL, May 12-14, 2002; [Proceedings of the International Workshop on Network and Operating System Support for D, May 12, 2002 (2802-05-12).

* cited by examiner

MOVING IMAGE DATA DISTRIBUTION SYSTEM, ITS METHOD, AND ITS PROGRAM

The present application is the National Phase of PCT/JP2008/063891, filed Aug. 1, 2008, which is based on Japanese Patent Application No. 2007-200932 (filed on Aug. 1, 2007), and claims a priority according to the Paris Convention based on the Japanese Patent Application No. 2007-200932. A disclosed content of the Japanese Patent Application No. 2007-200932 is incorporated in the specification of the present application by reference to the Japanese Patent Application No. 2007-200932.

TECHNICAL FIELD

The present invention relates to a moving image distribution system including a transmitting unit that transmits moving image data and a receiving unit that receives moving images.

BACKGROUND ART

Unlike analog television where received radio waves are demodulated for display, digital moving image signals are typically reproduced with a delay between the reception of the coded data and the reproduction of the same.

With moving image coding methods defined in MPEG (Moving Picture Experts Group) and the like, the amount of code to be generated varies greatly from one frame to another. In a viewing environment of limited bandwidth, there can occur fluctuations in the reception time of the frame data.

Bi-directional prediction encodes frames in changed order, which means that some of the frames will be received with a delay. If contents only demanded by a viewer are transmitted on an on-demand basis, there occurs a transmission delay from the viewer's view request to the reception of the data.

For the sake of reproducing contents immediately after a reproduction request or reproducing a plurality of pieces of contents without interruption, a technology called caching has been used to read the first data of the contents in advance.

As a concrete example of caching, a moving image distribution system with a read-ahead function described in PTL 1 will be described. FIG. 8 is a block diagram showing the configuration of the moving image distribution system with a read-ahead function described in PTL 1.

The technology described in PTL 1 includes a transmitting unit 910 that transmits content data and a receiving unit 920 that receives and reproduces the content data.

The transmitting unit 910 includes a transmission data storing unit 100, a first data transmitting unit 98, and a subsequent data transmitting unit 99. The receiving unit 920 includes a reception data storing unit 199 and a reproducing unit 201.

Next, description will be given of the operation of the technology described in PTL 1.

Initially, the first data transmitting unit 98 transmits first data 1002 of content data stored in the transmission data storing unit 100 as long as a first data reproduction time 1100 to the receiving unit 920.

The receiving unit 920 stores the transmitted first data 1002 into the reception data storing unit 199. When the receiving unit 920 reproduces the contents, the reproducing unit 201 reproduces the first data 1004 stored in the reception data storing unit 199.

In the meantime, the subsequent data transmitting unit 99 transmits subsequent data 1003, which is the data on the contents subsequent to the duration of the first data reproduction time 1100, to the receiving unit 920. The reproducing unit 201 reproduces the subsequent data 1003 subsequently to the reproduction of the first data 1004.

CITATION LIST

{Patent Literature}
  {PTL 1} JP-A-2002-344399

SUMMARY OF INVENTION

{Technical Problem}

The caching seen in the background art can be performed to absorb fluctuations in the arrival time of the frames of the first data ascribable to fluctuations in the amount of code to be generated, and to absorb changes in the reproduction time of some of the frames.

The first data increases in size as the reproduction contents have a higher bit rate. This gives rise to the problem that the first data transmission time increases if the first data is transmitted over a limited bandwidth.

Distribution services taking long to initialize and keeping users waiting are usually undesirable. For example, it is the that WWW (World Wide Web) users would quit browsing a single Web page if the Web page requires more than seven seconds to display.

If the contents to be provided are large in number or if the contents to be provided can be changed by search, recommendation, and other processing, it is significant to reduce the first data transmission time.

An object of the present invention is thus to provide a moving image data distribution system for distributing moving images, a moving image data distribution method, and a moving image data distribution program which allow quick data initialization even when the reproduction contents have a high bit rate.

{Solution to Problem}

According to the present invention, there is provided a moving image data distribution system for distributing reproduction content data that is hierarchically structured so that lower layer data is synthesized with upper layer data to form high quality data, in which the moving image data distribution system including a transmitting apparatus and a receiving apparatus, the transmitting apparatus including a transmission data storing unit that stores the reproduction content data, an upper layer first data length determining means for determining a data length of the upper layer first data based on a reproduction delay time from when the receiving apparatus receives only the upper layer data to when the receiving apparatus reproduces the reproduction contents, an upper layer first data transmitting means for reading upper layer first data determined based on the upper layer first data length from the storing unit, and transmitting the upper layer first data to the receiving apparatus, and an upper layer subsequent data transmitting means for reading upper layer subsequent data subsequent to the upper layer first data from the storing unit, and transmitting the upper layer subsequent data to the receiving apparatus, the receiving apparatus including a lower layer data storing unit that stores the lower layer data, a hierarchical data synthesizing means for synthesizing the lower layer data with the upper layer first data or the upper layer subsequent data, and a reproducing means for reproducing high quality data synthesized by the hierarchical data synthesizing means.

According to the present invention, there is also provided a transmitting apparatus of a moving image data distribution system for distributing reproduction content data that is hierarchically structured so that lower layer data is synthesized with upper layer data to form high quality data, the moving image data distribution system including the transmitting apparatus and a receiving apparatus, the transmitting apparatus including: a transmission data storing unit that stores the reproduction content data; an upper layer first data length determining means for determining a data length of the upper layer first data based on a reproduction delay time from when the receiving apparatus receives only the upper layer data to when the receiving apparatus reproduces the reproduction contents; an upper layer first data transmitting means for reading upper layer first data determined based on the upper layer first data length from the storing unit, and transmitting the upper layer first data to the receiving apparatus; and an upper layer subsequent data transmitting means for reading upper layer subsequent data subsequent to the upper layer first data from the storing unit, and transmitting the upper layer subsequent data to the receiving apparatus.

According to the present invention, there is also provided a receiving apparatus of a moving image data distribution system for distributing reproduction content data that is hierarchically structured so that lower layer data is synthesized with upper layer data to form high quality data, the moving image distribution system including a transmitting apparatus and the receiving apparatus, the receiving apparatus including: a lower layer data storing unit that stores the lower layer data; a hierarchical data synthesizing means for synthesizing the lower layer data with the upper layer first data or the upper layer subsequent data; and a reproducing means for reproducing high quality data synthesized by the hierarchical data synthesizing means.

According to the present invention, there is also provided a moving image data distribution method of a moving image data distribution system for distributing reproduction content data that is hierarchically structured so that lower layer data is synthesized with upper layer data to form high quality data, in which the moving image data distribution system including a transmitting apparatus and a receiving apparatus, the moving image data distribution method including: a step in which the transmitting apparatus stores the reproduction content data into a transmission data storing unit; an upper layer first data length determining step in which the transmitting apparatus determines a data length of the upper layer first data based on a reproduction delay time from when the receiving apparatus receives only the upper layer data to when the receiving apparatus reproduces the reproduction contents; an upper layer first data transmitting step in which the transmitting apparatus reads upper layer first data determined based on the upper layer first data length from the storing unit, and transmits the upper layer first data to the receiving apparatus; an upper layer subsequent data transmitting step in which the transmitting apparatus reads upper layer subsequent data subsequent to the upper layer first data from the storing unit, and transmits the upper layer subsequent data to the receiving apparatus; a step in which the receiving apparatus stores the lower layer data into a lower layer data storing unit; a hierarchical data synthesizing step in which the receiving apparatus synthesizes the lower layer data with the upper layer first data or the upper layer subsequent data; and a reproducing step in which the receiving apparatus reproduces high quality data synthesized in the hierarchical data synthesizing step.

According to the present invention, there is also provided a program for making a computer function as a transmitting apparatus of a moving image data distribution system for distributing reproduction content data that is hierarchically structured so that lower layer data is synthesized with upper layer data to form high quality data, the moving image data distribution system including the transmitting apparatus and a receiving apparatus, the transmitting apparatus including: a transmission data storing unit that stores the reproduction content data; an upper layer first data length determining means for determining a data length of the upper layer first data based on a reproduction delay time from when the receiving apparatus receives only the upper layer data to when the receiving apparatus reproduces the reproduction contents; an upper layer first data transmitting means for reading upper layer first data determined based on the upper layer first data length from the storing unit, and transmitting the upper layer first data to the receiving apparatus; and an upper layer subsequent data transmitting means for reading upper layer subsequent data subsequent to the upper layer first data from the storing unit, and transmitting the upper layer subsequent data to the receiving apparatus.

According to the present invention, there is also provided a program for making a computer function as a receiving apparatus of a moving image data distribution system for distributing reproduction content data that is hierarchically structured so that lower layer data is synthesized with upper layer data to form high quality data, the moving image distribution system including a transmitting apparatus and the receiving apparatus, the receiving apparatus including: a lower layer data storing unit that stores the lower layer data; a hierarchical data synthesizing means for synthesizing the lower layer data with the upper layer first data or the upper layer subsequent data; and a reproducing means for reproducing high quality data synthesized by the hierarchical data synthesizing means.

{Advantageous Effects of Invention}

According to the present invention, it is possible to reduce the first data transmission time by transmitting only the upper layer data when low quality data has already been viewed on a receiving terminal that contains the lower layer data.

DESCRIPTION OF EMBODIMENTS

Next, embodiments of the present invention will be described with reference to the drawings.

[First Embodiment]

Figure 1:
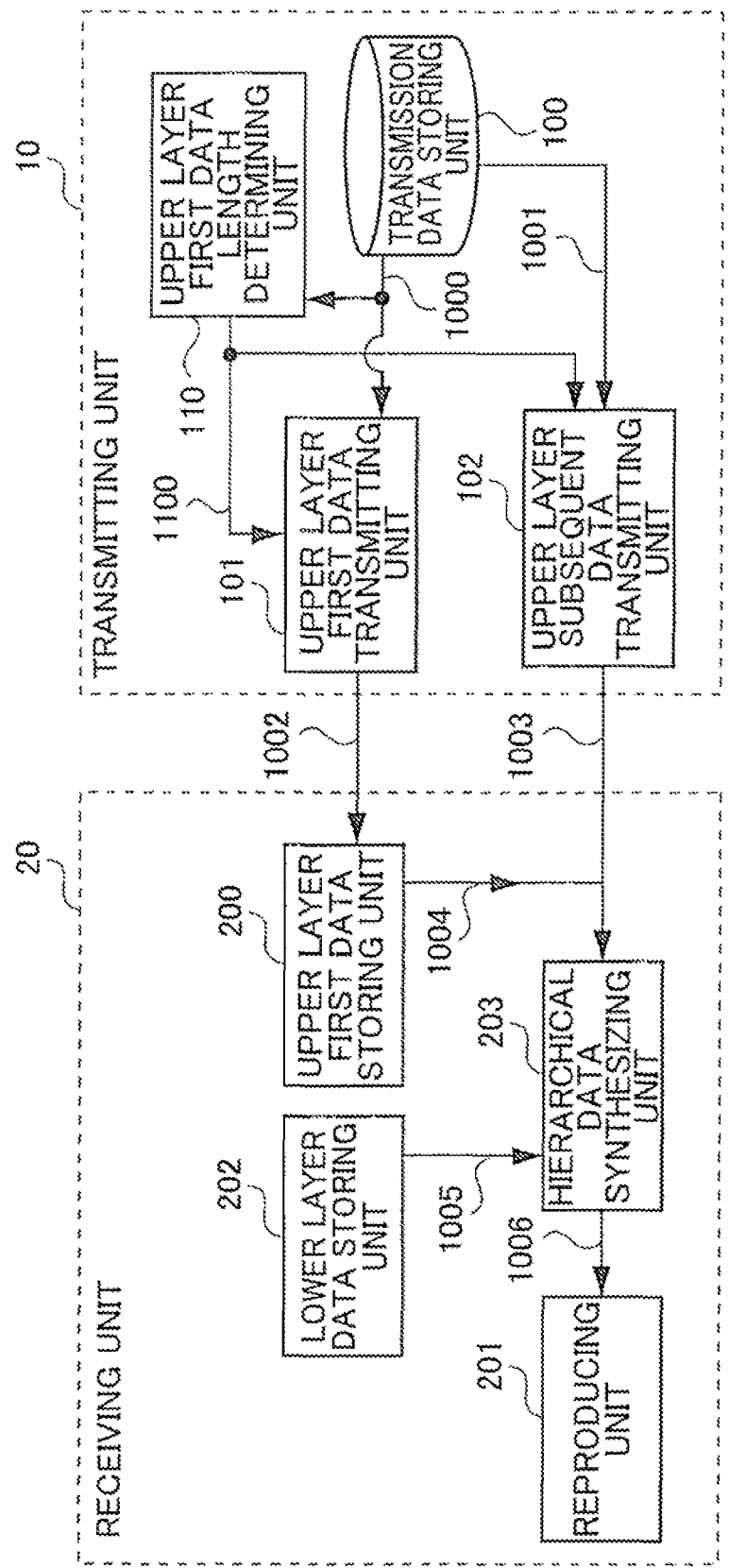
{FIG. 1} A block diagram showing the configuration of a first embodiment of the present invention.

FIG. 1 is a block diagram showing a first embodiment of the moving image distribution system according to the present invention. The distribution system according to the first embodiment of the present invention includes a transmitting unit 10 and a receiving unit 20.

The transmitting unit 10 includes a transmission data storing unit 100, an upper layer first data transmitting unit 101, an upper layer subsequent data transmitting unit 102, and an upper layer first data length determining unit 110.

The transmission data storing unit 100 contains data on reproduction contents. The content data stored is hierarchically coded. The data is scalable in one or a plurality of directions including time (frame rate), space (resolution), and image quality (bit rate). Some of the data can be extracted for reduced frame rate, resolution, and/or bit rate.

The international standards of the hierarchical coding methods include MPEG-2 scalable, MPEG-4 scalable, MPEG-4 FGS, H.264/MPEG-4 AVC scalable video coding, and Motion JPEG 2000. The present invention is applicable to such hierarchical coding methods illustrated and other hierarchical coding methods.

The receiving unit 20 includes inside an upper layer first data storing unit 200, a reproducing unit 201, a lower layer data storing unit 202, and a hierarchical data synthesizing unit 203.

The receiving unit 20 becomes capable of reproducing contents when upper layer first data is stored in the upper layer first data storing unit 200.

The lower layer data on the reproduction contents is previously stored in the lower layer data storing unit 202 by the point in time when the contents are reproduced.

The present embodiment assumes a situation where a user who has viewed low quality contents on a mobile terminal such as a cellular phone and a PDA (Personal Data Assistant) views the same contents in high quality on the receiving unit 20 which is a part of the embodiment of the present invention.

In such a case, it is assumed that the low quality content data, or lower layer data, has already been transferred from a server to the receiving unit 20, i.e., the lower layer data storing unit 202 directly or through a home gateway before the contents are viewed on the receiving unit 20.

Figure 2:
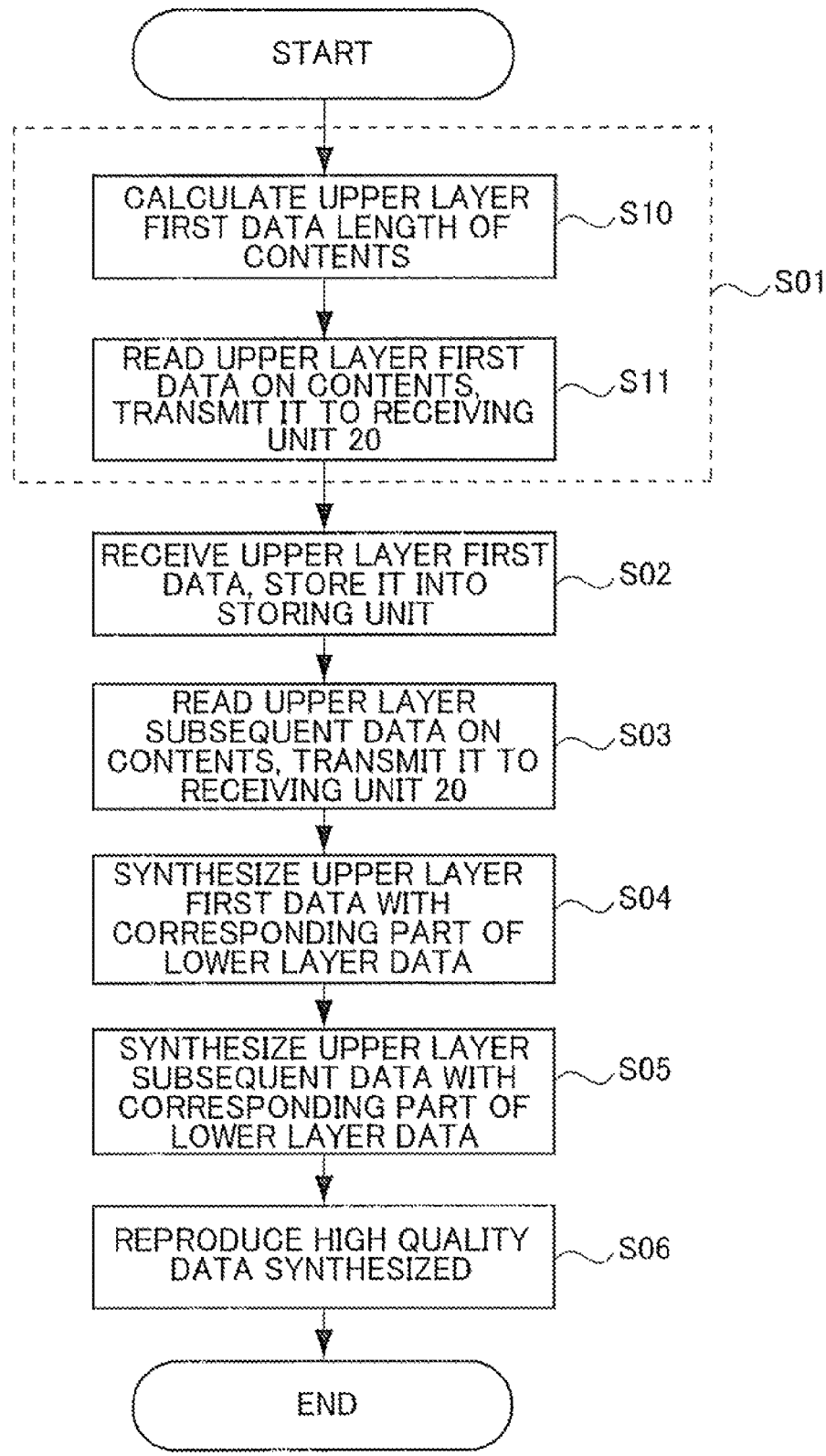
{FIG. 2} A flowchart showing the procedure of processing of a transmitting unit according to the first embodiment of the present invention.

FIG. 2 is a flowchart showing the procedure of processing of the transmitting unit 10. Referring to FIGS. 1 and 2, the procedure of processing of the transmitting unit 10 will be described.

Prior to the reproduction of contents by the receiving unit 20, the transmitting unit 10 transmits upper layer first data on the reproduction contents (step S01).

Here, step S01 will be detailed in the following S10 and S11.

The upper layer first data length determining unit 110 calculates a reproduction delay time for the case of transmitting only the upper layer data to the receiving unit 20, and determines an upper layer first data length 1100 (S10). The upper layer first data transmitting unit 101 reads upper layer data as long as the upper layer first data length 1100 from the transmission data storing unit 100, and transmits the upper layer data to the receiving unit 20 (S11).

The reproduction delay time includes both a buffering time for absorbing fluctuations in the arrival completion time of the frames at the receiving unit 20 and a buffering time for absorbing a delay in the reproduction start time ascribable to changes in the order of the reproduction times of pictures. The upper layer first data length is a data length corresponding to either one or the sum of the two buffering times when transmitting only the upper layer first data.

The buffering time for absorbing fluctuations in the arrival completion time is defined as a maximum difference in time between the frame data arrival completion times and decoding times of the respective frames, the frame data arrival completion times being determined by the amounts of code of the respective frames and the transmission band. The buffering time for absorbing a delay in the reproduction start time is determined based on a maximum difference in time between the decoding times and display times of the respective frames.

Figure 3:
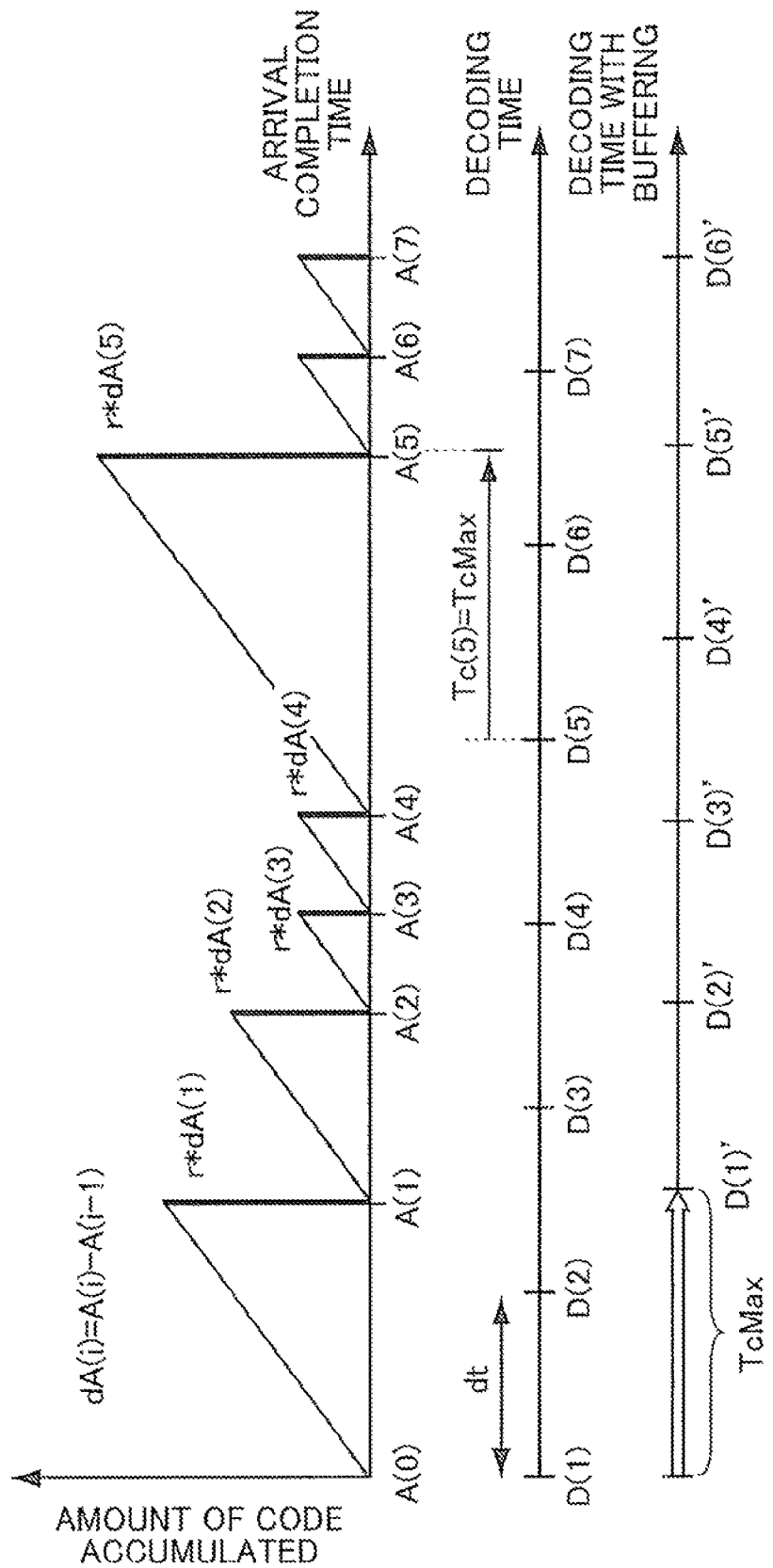
{FIG. 3} A diagram for explaining fluctuations in the arrival completion time of frames.

FIG. 3 explains the buffering time for fluctuations in the arrival completion time. In FIG. 3, $A(i)$ ($i=1, \ldots, 7$) indicates the arrival completion time of data on a frame i when data reception is started at time 0.

Assuming that the transmission bit rate is r and the data transmission time of the frame i is $dA(i)=A(i)-A(i-1)$, the amount of code of the frame i is given by $r*dA(i)$.

$D(i)$ is the decoding time of the frame i when the decoding is started at time 0 and frames are decoded at regular time intervals of a reproduction time interval dt. The difference $Tc(i)$ between the frame data arrival completion time $A(i)$ and the decoding time $D(i)$ of each frame is given by $Tc(i)=A(i)-D(i)$. The maximum value of $Tc(i)$ will be referred to as TcMax. Here, $$TcMax+D(i)>A(i)$$

holds always true.

In other words, if the decoding is started after TcMax of buffering, it is ensured that the pieces of data arrive by the respective decoding times.

The diagram shows the case where $Tc(i)$ reaches a maximum at $i=5$. That is, the diagram shows the case where TcMax is obtained when $i=5$. Here, $TcMax=A(5)-4*dt$.

Now, referring to FIG. 4, description will be given of a delay in the reproduction start time ascribable to changes in the order of the reproduction times of pictures.

Figure 4:
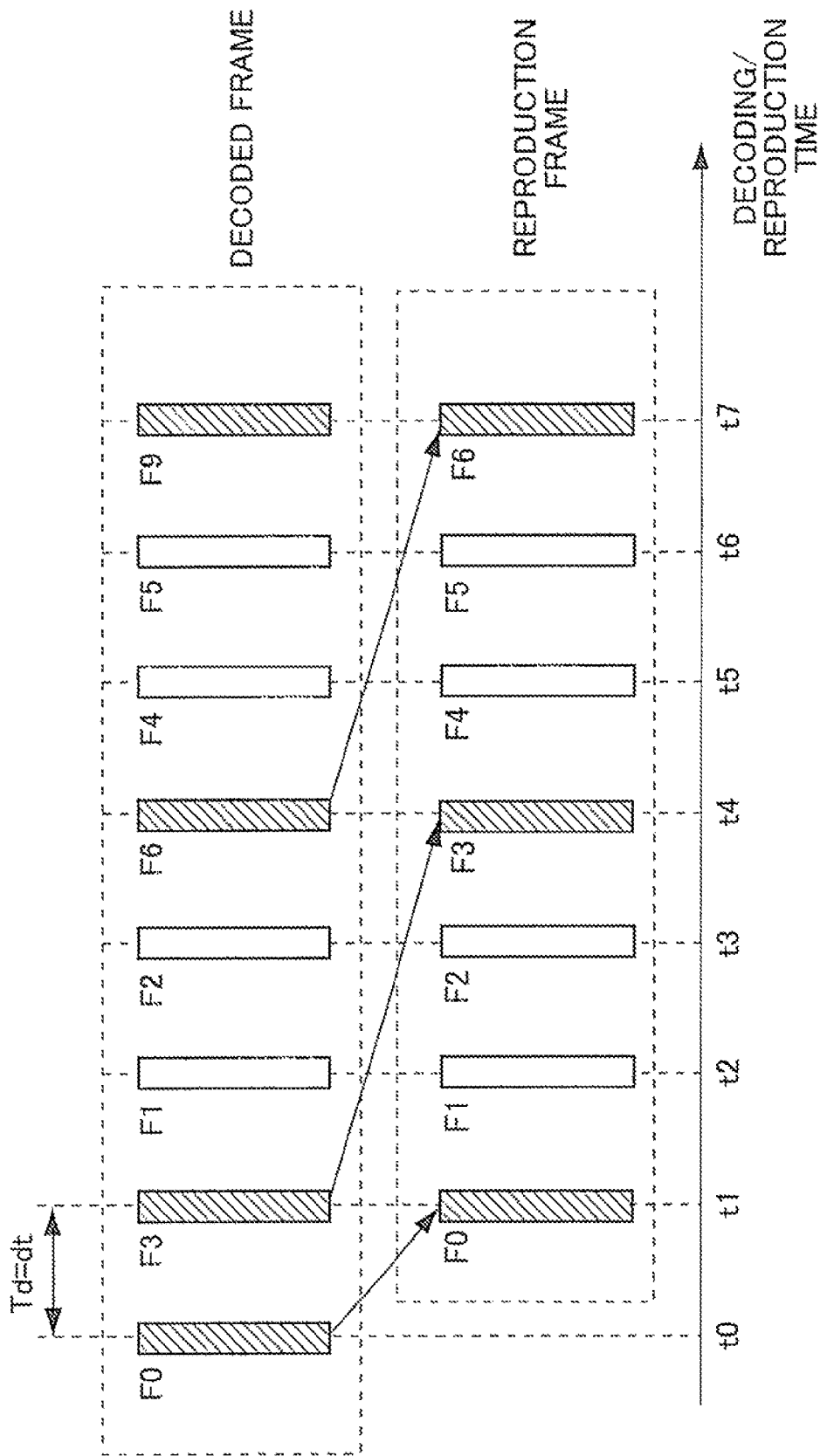
{FIG. 4} A diagram for explaining a delay in reproduction start time.

In FIG. 4, the strips in the top row show frames in order of decoding. The strips in the bottom row show frames in order of reproduction. A frame Fi represents the ith frame to be reproduced. The gray frames are ones to be referred to when decoding other frames. The white frames are ones that are not referred to when decoding any other frame.

In FIG. 4, the frames F1 and F2 make reference to the decoded frames F0 and F3. The frames F4 and F5 make reference to the decoded frames F3 and F6. In the case of FIG. 4 where the reproduction times of pictures such as the frames F3 and F6 change in order, the reproduction start time needs to be delayed behind the decoding start time by one frame.

When the decoding is performed at regular time intervals of the reproduction time interval dt, the buffering time Td is dt.

As much non-reference frames as the time Td, i.e., the frame F0 shown in FIG. 4 is initially transmitted to the receiving unit 20 prior to reproduction. At the start of reproduction, the frames F0 and F1 are decoded continuously without the interval of dt. Such an adjustment can reduce the delay in the reproduction start time.

Consequently, the total buffering time is TcMax+Td, where TcMax is the buffering time for absorbing fluctuations in the arrival completion time and Td is the buffering time for absorbing a delay in the reproduction start time.

Figure 5:
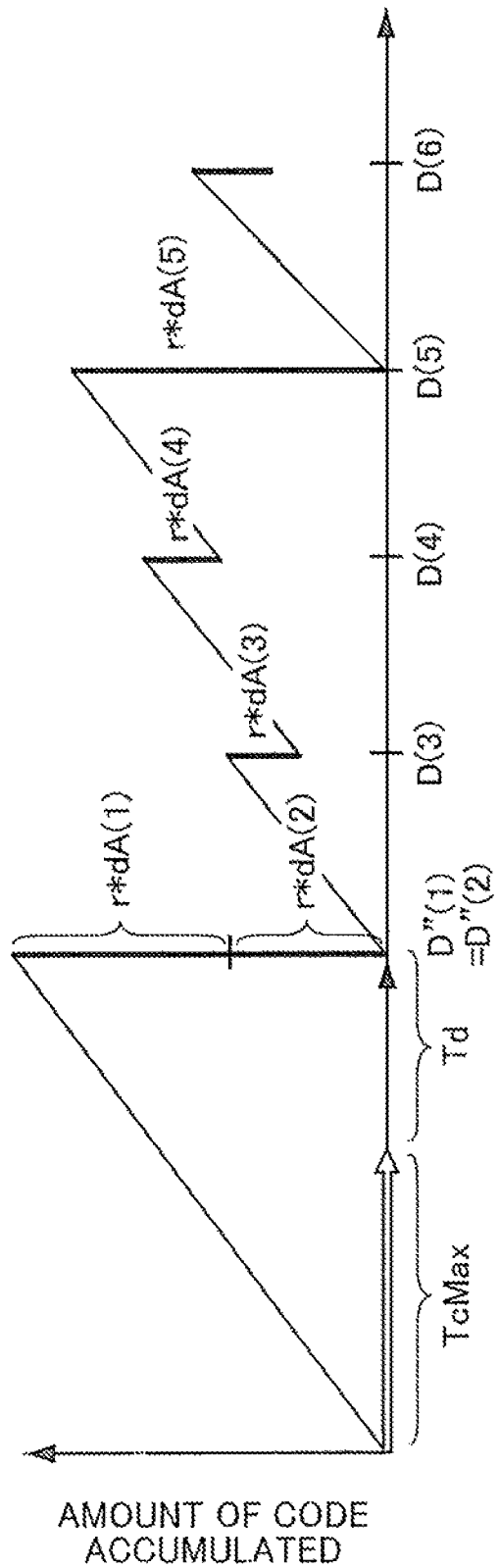
{FIG. 5} A diagram for explaining reproduction time when buffering is performed in consideration of fluctuations in the arrival completion time of frames and a delay in the reproduction start time.

FIG. 5 is a graph showing the behavior of the amount of code generated when the foregoing two buffering times are taken into account.

In FIG. 5, the first and second frames are decoded after the total buffering time, and the subsequent frames are decoded at intervals of time dt each. At a time of $3*dt$ after the total buffering time, the fifth frame is decoded. Because $TcMax=A(5)-4*dt$ as shown in FIG. 3, the total buffering time of $TcMax+Td$ and the time of $3*dt$ allow the accumulation of the data from the frame 1 to the frame 5.

Since only the upper layer data is concerned, the range of fluctuations in the amount of code generated, the average amount of code of a frame, and the amount of code of the non-reference picture at the beginning of the contents are smaller than those of high quality data that is obtained by synthesizing the upper layer and lower layer, or those of content data that has the same quality as that of the upper layer and is not hierarchically coded.

The buffing time for absorbing fluctuations in the arrival completion time and the buffering time for absorbing a delay in the reproduction start time thus become shorter.

Consequently, the first data transmission time according to the present embodiment is shorter than when transmitting the high quality data that is obtained by synthesizing the upper and lower layers according to the related technologies or when transmitting the content data that is not hierarchically coded.

Next, description will be continued of the operation of the transmitting unit 10 and the receiving unit 20 after the transmission of the upper layer first data.

The receiving unit 20 receives the upper layer first data 1002 from the transmitting unit 10, and stores the upper layer first data 1002 into the upper layer first data storing unit 200 (S02).

The upper layer subsequent data transmitting unit 102 reads upper layer subsequent data 1001 based on the upper layer first data length 1100, and transmits the upper layer subsequent data 1001 to the receiving unit 20 (S03).

When reproducing the contents, the hierarchical data synthesizing unit 203 synthesizes the upper layer first data 1004 stored in above S03 and the corresponding part 1005 of the lower layer data to generate high quality data 1006 (S04).

The reproducing unit 201 then decodes the high quality data 1006. The hierarchical data synthesizing unit 203 subsequently synthesizes the upper layer subsequent data 1003 received from the upper layer subsequent data transmitting unit 102 and the corresponding part 1005 of the lower layer data to generate high quality data 1006 (S05).

The reproducing unit 201 continues reproducing the high quality data 1006 (S06). This allows reproduction immediately after the start of reception of the subsequent data.

The embodiment of the present invention shown in FIG. 1 is such that the receiving unit 20 receives the upper layer subsequent data 1003 at fixed timing.

The present invention, however, is also applicable to instant reproduction at a point in time when the receiving unit 20 selects content reproduction and makes a request for the transmission of the subsequent data.

Figure 6:
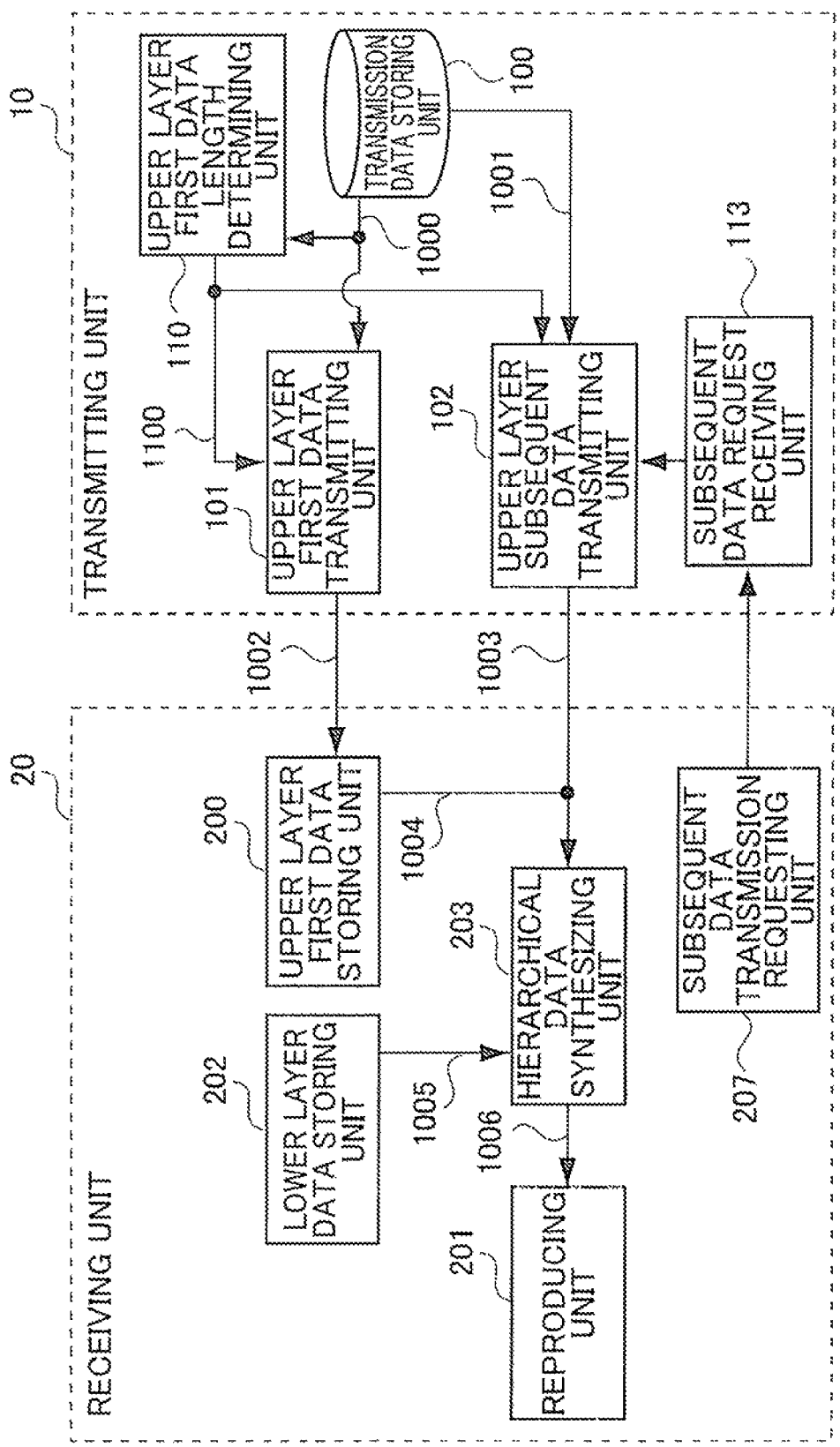
{FIG. 6} A block diagram showing the configuration of the first embodiment of the present invention when a receiving unit controls content reproduction timing.

FIG. 6 is a block diagram showing the configuration of the embodiment of the present invention when the receiving unit controls the content reproduction timing. When compared to the transmitting unit 10 shown in FIG. 1, the transmitting unit 10 of FIG. 6 differs in that it further includes a subsequent data request receiving unit 113 inside. When compared to the receiving unit 20 shown in FIG. 1, the receiving unit 20 of FIG. 6 differs in that it further includes a subsequent data transmission requesting unit 207 inside.

Referring to FIG. 6, description will now be given of the embodiment where the receiving unit 20 controls the content reproduction timing.

Before the receiving unit 20 selects content reproduction, the transmitting unit 10 transmits the upper layer first data 1002 from the upper layer first data transmitting unit 101.

The upper layer first data length determining unit 110 determines the first data length based on a transmission delay time from when the receiving unit 20 transmits a request to the transmitting unit 10 to when the receiving unit 20 receives subsequent data, in addition to the foregoing buffering times which have been described with reference to FIGS. 3, 4, and 5.

The transmission delay time is measured by sending a signal from the receiving unit 20 to the transmitting unit 10. Possible examples of the transmission delay time include a round trip time that is calculated by the TCP retransmission timeout procedure, and a time that elapses between when the transmitting unit 10 sends stream-related information Sender Report to the receiving unit 20 and when the transmitting unit 10 receives reception quality-related information Receiver Report from the receiving unit 20 under a transfer control protocol such as RTCP (RTP Control Protocol). In such cases, the first data length is defined as the sum of the buffering times and the transmission delay time.

The transmitting unit 10 waits until it accepts a transmission request for the upper layer subsequent data from the receiving unit 20.

When the receiving unit 20 selects content reproduction subsequently, the hierarchical data synthesizing unit 203 reads the upper layer first data 1004 stored in the upper layer first data storing unit 200. The hierarchical data synthesizing unit 203 also reads part of the lower layer data that is stored in the lower layer data storing unit 202 and corresponds to the upper layer first data 1004. Based on the two pieces of read data, the hierarchical data synthesizing unit 203 generates high quality data 1006 and outputs the high quality data 1006 to the reproducing unit.

In the meantime, the subsequent data transmission requesting unit 207 transmits an upper layer subsequent data transmission request 1105 to the transmitting unit 10.

When the subsequent request receiving unit 113 receives the upper layer subsequent data transmission request 1105, the upper layer subsequent data transmitting unit 102 transmits the upper layer subsequent data 1003 to the receiving unit 20.

In the receiving unit 20, the hierarchical data synthesizing unit 203 synthesizes the upper layer subsequent data 1003 received and the lower layer data that is stored in the lower layer data storing unit 202 and corresponds to the upper layer subsequent data 1003 to generate high quality data 1006, and outputs the high quality data 1006 to the reproducing unit 201.

Note that content reproduction is selected by an input from the user or based on certain temporal timing.

Now, suppose that there are a plurality of candidates of reproduction contents and the selection of content reproduction is made frequently. If a transmission request for upper layer subsequent data is made simultaneously with the selection of content reproduction, the processing load of the subsequent data request receiving unit 113 can be enormous. A reproduction request made for a piece of contents can possibly be switched to another content reproduction immediately.

For such reasons, the delay time from the selection of content reproduction to the upper layer subsequent data transmission request may be determined in consideration of the processing power of the transmitting unit 10 and the transmission band.

The transmission request for upper layer subsequent data may thus be made simultaneously with the selection of content reproduction or after a certain time of delay.

[Second Embodiment]

Figure 7:
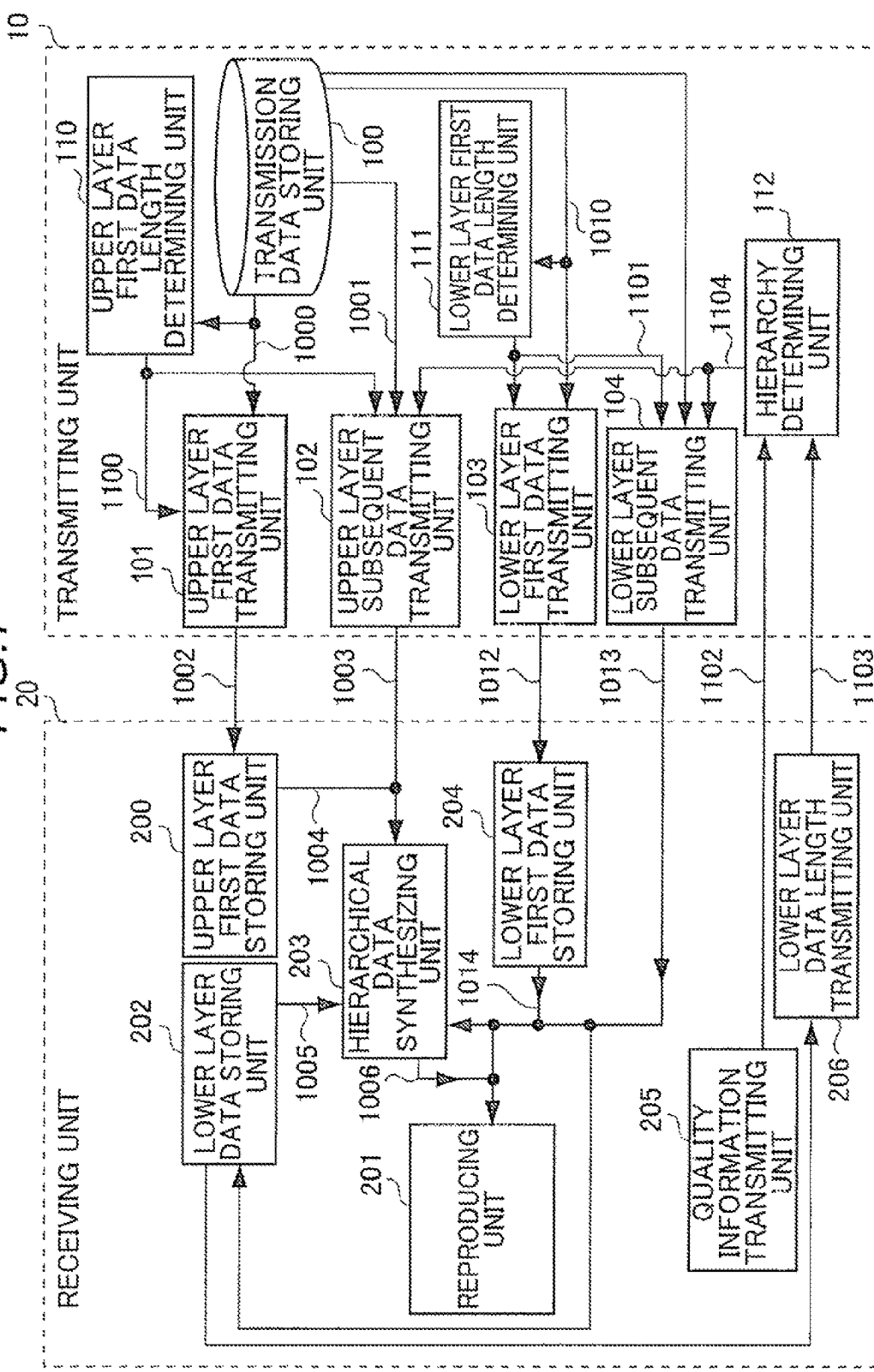
{FIG. 7} A block diagram showing the configuration of a second embodiment of the present invention.
Figure 8:
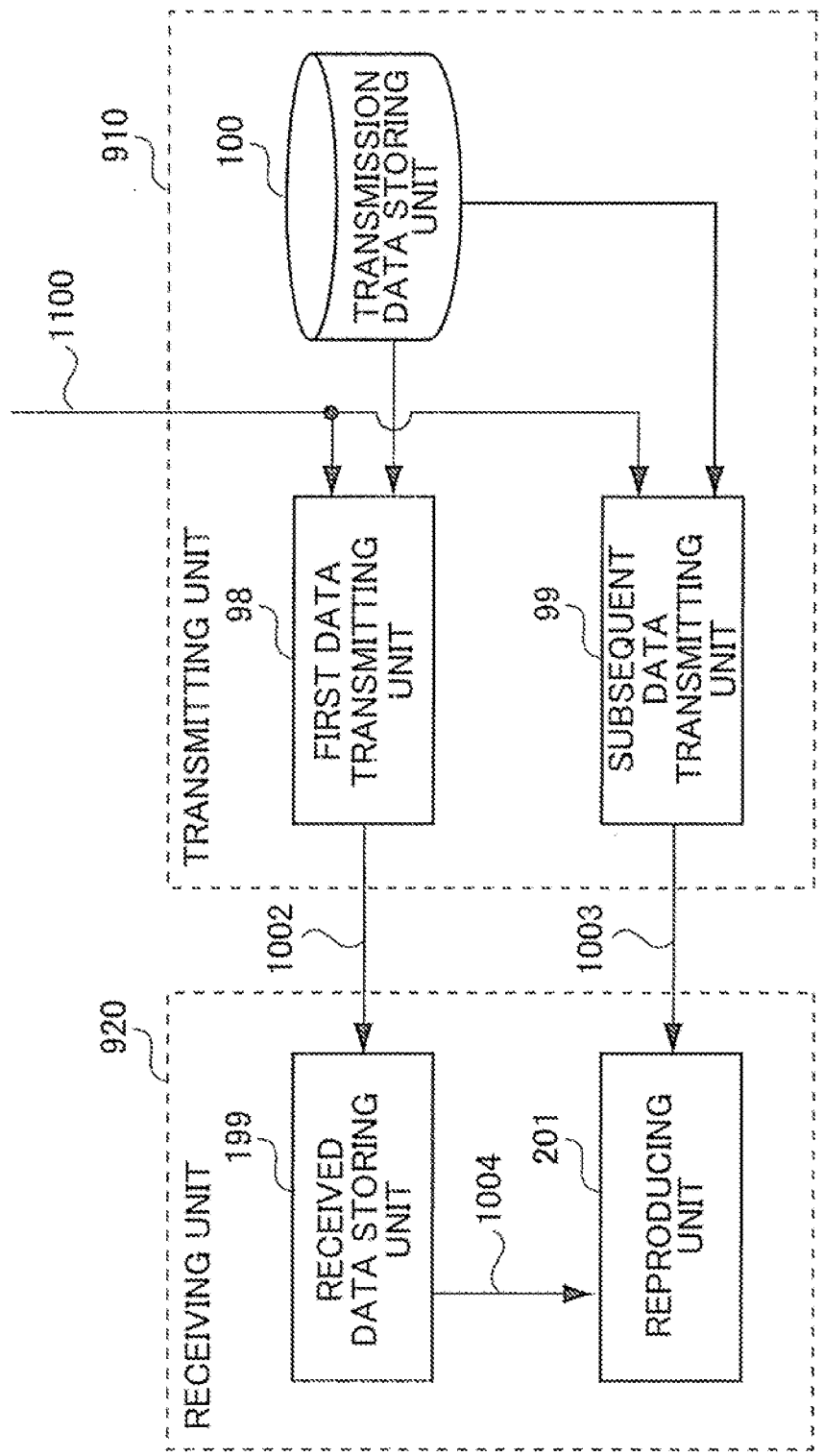
{FIG. 8} A block diagram showing the configuration of the related technology.

FIG. 7 is a block diagram showing a second embodiment of the moving image distribution system according to the present invention. The transmitting unit 10 according to the second embodiment differs from the transmitting unit 10 of the first embodiment shown in FIG. 1 in that it includes a lower layer first data transmitting unit 103, a lower layer subsequent data transmitting unit 104, a lower layer first data length determining unit 111, and a hierarchy determining unit 112.

The receiving unit 20 according to the present embodiment differs from the receiving unit 20 of the first embodiment shown in FIG. 1 in that it includes a lower layer first data storing unit 204, a quality information transmitting unit 205, and a lower layer data length transmitting unit 206.

In the present embodiment, the transmitting unit 10 switches the subsequent data to be transmitted depending on quality information on reproduction content data which is transmitted from the quality information transmitting unit 205 and the lower layer data length transmitting unit 206 to the transmitting unit.

The present embodiment is applied to a case where low quality contents and high quality contents are switched and viewed on an identical receiving terminal. A concrete illustration thereof will be given below.

If there are a large number of pieces of contents to view, the viewer initially browses the pieces of contents by small amounts as if switching (zapping) TV channels. When desired contents are found, the viewer stops zapping and views the contents with closer attention.

When browsing, it is important to immediately switch from one piece of contents to another. The content quality may be low.

When viewing with attention, it is not the switching speed of the contents but the quality of the contents that is more important.

When there is such a demand that the viewer views low quality contents for a certain period of time before viewing the contents in high quality again, the transmitting unit 10, which constitutes an embodiment of the present invention, can meet the demand by making the upper layer first data length shorter.

Hereinafter, the operation of the present embodiment will be described with reference to FIG. 7.

Before the viewing of reproduction contents on the receiving unit 20, the transmitting unit 10 transmits upper layer first data 1002 and lower layer first data 1012.

The upper layer first data length determining unit 110 and the lower layer first data length determining unit 111 determine an upper layer data first data length 1100 and a lower layer first data length 1101, respectively.

The first data lengths are each determined from the buffering times and the transmission delay time which have been described with reference to FIGS. 3, 4, and 5.

The upper layer first data transmitting unit 101 and the lower layer first data transmitting unit 103 read upper layer data 1000 and lower layer data 1010 as long as the respective first data lengths from the transmission data storing unit 100, and transmit the data to the receiving unit. The receiving unit 20 stores the pieces of data transmitted to the upper layer first data storing unit 200 and the lower layer first data storing unit 204, respectively.

When the receiving unit 20 reproduces the reproduction contents, the quality information transmitting unit 205 transmits reproduction quality information 1102 on the contents to the transmitting unit 10.

In the transmitting unit 10, the hierarchy determining unit 112 determines whether or not to activate the upper layer subsequent data transmitting unit 102 and the lower layer subsequent data transmitting unit 104.

When reproducing low quality data, the transmitting unit 10 and the receiving unit 20 operate by the same method as that of the related technology that has been described in the section of the background art.

In the receiving unit 20, the reproducing unit 201 reproduces lower layer first data 1014 stored in the lower layer first data storing unit 204. Then, the reproducing unit 201 continues to reproduce lower layer subsequent data 1013 received. The lower layer first data 1014 and the lower layer subsequent data 1013 are stored into the lower layer data storing unit 202.

When reproducing high quality data, the quality information transmitting unit 205 transmits reproduction quality information 1102 that indicates the upper layer. At the same time, the lower layer data length transmitting unit 206 transmits a lower layer data transmission time 1103 which is stored in the lower layer data storing unit 202.

The hierarchy determining unit 112 specifies that only the upper layer subsequent data transmitting unit 102 transmits data as the data within the lower layer data reproduction time 1103.

The hierarchy determining unit 112 subsequently specifies that both the upper layer subsequent data transmitting unit 102 and the lower layer subsequent data transmitting unit 104 transmit data as the data after the lower layer data reproduction time 1103.

For content reproduction within the lower layer data reproduction time 1103, the receiving unit 20 performs the same processing as in the first embodiment of the present invention.

For content reproduction after the lower layer data reproduction time 1103, the hierarchical data synthesizing unit 203 synthesizes the upper layer subsequent data 1003 and the lower layer subsequent data 1013 received from the upper layer subsequent data transmitting unit 102 and the lower layer subsequent data transmitting unit 104 to generate high quality data 1006. The reproducing unit 201 reproduces the high quality data 1006.

While in the present embodiment, the lower layer data storing unit 202 stores both the lower layer first data 1012 and the lower layer subsequent data 1013, the present invention is also applicable when the lower layer data storing unit 202 stores the lower layer subsequent data 1013 alone. In such a case, the lower layer first data stored in the lower layer first data storing unit 204 or the lower layer subsequent data stored in the lower layer data storing unit 202 is read for the reproduction of high quality data.

It should be noted that the moving image data distribution system may be implemented by hardware, software, or a combination of these.

The typical embodiments of the present invention have been described in detail. However, it is to be understood that various changes, substitutions, and alternatives can be made without departing from the spirit and the scope of the invention defined in the claims. Moreover, the inventor contemplates that an equivalent range of the claimed invention is kept even if the claims are amended in proceedings of the application.

INDUSTRIAL APPLICABILITY

As an example of utilization, the present invention may be applied to applications such as a moving image distribution system in which moving image contents are distributed in low quality or high quality, or a terminal that receives data from the distribution system and reproduces moving images.

REFERENCE SIGNS LIST

10: transmitting unit
20: receiving unit

100: transmission data storing unit
101: upper layer first data transmitting unit
102: upper layer subsequent data transmitting unit
103: lower layer first data transmitting unit
104: lower layer subsequent data transmitting unit
110: upper layer first data length determining unit
111: lower layer first data length determining unit
112: hierarchy determining unit
113: subsequent data request receiving unit
200: upper layer first data storing unit
201: reproducing unit
202: lower layer data storing unit
203: hierarchical data synthesizing unit
204: lower layer first data storing unit
205: quality information transmitting unit
206: lower layer data length transmitting unit
207: subsequent data transmission requesting unit

The invention claimed is:

1. A moving image data distribution system for distributing reproduction content data that is hierarchically structured so that lower layer data is synthesized with upper layer data to form high quality data, wherein
the moving image data distribution system comprising a transmitting apparatus and a receiving apparatus,
the transmitting apparatus including:
first hardware including a processor;
a transmission data storing unit that stores the reproduction content data;
an upper layer first data length determining unit implemented at least by the first hardware to determine a data length of the upper layer first data based on a reproduction delay time from when the receiving apparatus receives only the upper layer data to when the receiving apparatus reproduces the reproduction contents;
an upper layer first data transmitting unit implemented at least by the first hardware to read upper layer first data determined based on the upper layer first data length from the storing unit, and transmitting the upper layer first data to the receiving apparatus; and
an upper layer subsequent data transmitting unit implemented at least by the first hardware to read upper layer subsequent data subsequent to the upper layer first data from the storing unit, and transmitting the upper layer subsequent data to the receiving apparatus,
the receiving apparatus including:
second hardware including a processor;
a lower layer data storing unit that stores the lower layer data;
a hierarchical data synthesizing unit implemented at least by the second hardware to synthesize the lower layer data with the upper layer first data or the upper layer subsequent data; and
a reproducing unit implemented at least by the second hardware to reproduce high quality data synthesized by the hierarchical data synthesizing unit,
wherein said upper layer first data and said upper layer subsequent data are included in the same upper layer and are in anteroposterior relationship along the playing time axis of said reproduction contents.

2. The moving image data distribution system according to claim 1, wherein
the transmitting apparatus further includes
a unit for transmitting the upper layer subsequent data to the transmitting apparatus in response to a transmission request from the receiving apparatus; and
the receiving apparatus further includes
a unit for making a transmission request for the upper layer subsequent data to the transmitting apparatus when synthesizing the upper layer first data and part of the lower layer data corresponding to the upper layer first data for reproduction.

3. The moving image data distribution system according to claim 1, wherein
the transmitting apparatus further includes:
a lower layer first data length determining unit for determining a data length of the lower layer first data based on a reproduction delay time from when the receiving apparatus receives only the lower layer data to when the receiving apparatus reproduces the reproduction contents;
a lower layer first data transmitting unit for reading lower layer first data determined based on the lower layer first data length from the storing unit, and transmitting the lower layer first data to the receiving apparatus;
a lower layer subsequent data transmitting unit for reading lower layer subsequent data subsequent to the lower layer first data from the storing unit, and transmitting the lower layer subsequent data to the receiving apparatus; and
a hierarchy determining unit for determining whether or not to transmit the upper layer subsequent data and the lower layer subsequent data to the receiving apparatus based on reproduction content quality information from the receiving apparatus, and
the hierarchical data synthesizing unit synthesizes the lower layer first data or the lower layer subsequent data with the upper layer first data or the upper layer subsequent data;
the reproducing unit reproduces any one or a combination of the lower layer first data, the lower layer subsequent data, and the high quality data synthesized by the hierarchical data synthesizing unit, and
the receiving apparatus further includes:
a unit for, when reproducing the lower layer data, reproducing the lower layer first data and transmitting reproduction content quality information indicating the lower layer to the transmitting apparatus; and
a unit for, when reproducing high quality data, synthesizing the upper layer first data and part of the lower layer data corresponding to the upper layer first data to generate the high quality data, reproducing the high quality data, and transmitting reproduction content quality information indicating the upper layer to the transmitting apparatus.

4. The moving image data distribution system according to claim 3, wherein
the receiving apparatus further includes
a lower layer data length transmitting unit for transmitting a transmitted lower layer data reproduction time to the transmitting apparatus, the transmitted lower layer data reproduction time being a reproduction time of the lower layer data received previously, and
if transmitted upper layer data transmitted by the upper layer first data transmitting unit and the upper layer subsequent data transmitting unit has a reproduction time shorter than the transmitted lower layer data reproduction time, the lower layer subsequent data transmitting unit transmits the upper layer subsequent data and corresponding lower layer subsequent data after the transmitting apparatus continues transmitting only the upper layer subsequent data and the transmitted upper layer data reproduction time becomes equal to the transmitted lower layer data reproduction time.

5. The moving image data distribution system according to claim 1, wherein the reproduction delay time is either one or a combination of a maximum difference in time between decoding times and display times of respective frames and a maximum difference in time between frame data arrival completion times and the decoding times of the respective frames, the frame data arrival completion times being determined by amounts of code of additional data in the respective frames and a transmission band; and the transmitting apparatus determines the length of first additional data based on the reproduction delay time.

6. The moving image data distribution system according to claim 2, wherein a transmission delay time from when the receiving apparatus transmits a transmission request for reproduction contents or reproduction content quality information to the transmitting apparatus to when the receiving apparatus receives the upper layer subsequent data can be considered as the reproduction delay time.

7. The moving image data distribution system according to claim 1, wherein the reproduction content data is coded by hierarchical coding that is scalable in any one or a combination of time, space, and image quality.

8. A transmitting apparatus of a moving image data distribution system for distributing reproduction content data that is hierarchically structured so that lower layer data is synthesized with upper layer data to form high quality data, the moving image data distribution system including the transmitting apparatus and a receiving apparatus, the transmitting apparatus comprising:

hardware including a processor;

a transmission data storing unit that stores the reproduction content data;

an upper layer first data length determining implemented at least by the hardware to determine a data length of the upper layer first data based on a reproduction delay time from when the receiving apparatus receives only the upper layer data to when the receiving apparatus reproduces the reproduction contents;

an upper layer first data transmitting unit implemented at least by the hardware to read upper layer first data determined based on the upper layer first data length from the storing unit, and transmitting the upper layer first data to the receiving apparatus; and an upper layer subsequent data transmitting unit implemented at least by the hardware to read upper layer subsequent data subsequent to the upper layer first data from the storing unit, and transmitting the upper layer subsequent data to the receiving apparatus, wherein said upper layer first data and said upper layer subsequent data are included in the same upper layer and in anteroposterior relationship along the playing time axis of said reproduction contents.

9. The transmitting apparatus according to claim 8, further comprising a unit for transmitting the upper layer subsequent data to the transmitting apparatus in response to a transmission request from the receiving apparatus.

10. The transmitting apparatus according to claim 8, further comprising:

a lower layer first data length determining unit for determining a data length of the lower layer first data based on a reproduction delay time from when the receiving apparatus receives only the lower layer data to when the receiving apparatus reproduces the reproduction contents;

a lower layer first data transmitting unit for reading lower layer first data determined based on the lower layer first data length from the storing unit, and transmitting the lower layer first data to the receiving apparatus;

a lower layer subsequent data transmitting unit for reading lower layer subsequent data subsequent to the lower layer first data from the storing unit, and transmitting the lower layer subsequent data to the receiving apparatus; and a hierarchy determining unit for determining whether or not to transmit the upper layer subsequent data and the lower layer subsequent data to the receiving apparatus based on reproduction content quality information from the receiving apparatus.

11. The transmitting apparatus according to claim 10, further comprising a lower layer data length transmitting unit for transmitting a transmitted lower layer data reproduction time to the transmitting apparatus, the transmitted lower layer data reproduction time being a reproduction time of the lower layer data received previously, and wherein if transmitted upper layer data transmitted by the upper layer first data transmitting unit and the upper layer subsequent data transmitting unit has a reproduction time shorter than the transmitted lower layer data reproduction time, the lower layer subsequent data transmitting unit transmits the upper layer subsequent data and corresponding lower layer subsequent data after the transmitting apparatus continues transmitting only the upper layer subsequent data and the transmitted upper layer data reproduction time becomes equal to the transmitted lower layer data reproduction time.

12. A receiving apparatus for reproducing a high quality picture with reproduction content data as an input, the reproduction content data being hierarchically structured and including lower layer data equivalent to coded data on a low quality picture and upper layer data equivalent to additional data, the receiving apparatus comprising:

hardware including a processor;

a storing unit for storing upper layer first data and the lower layer data prior to reproduction processing, the upper layer first data being first data of the upper layer data; and a reproducing unit implemented at least by the hardware to perform first reproduction processing for reproducing the upper layer first data and the lower layer data according to a reproduction request from a user, and performing second reproduction processing for receiving upper layer subsequent data from a transmitting apparatus during the first reproduction processing and reproducing the upper layer subsequent data and the lower layer data subsequently, the upper layer subsequent data being subsequent data of the upper layer first data, wherein the upper layer first data having a data length determined based on a transmission bit rate of the upper layer first data and a reproduction time of the first data of the upper layer, the reproduction time of the upper layer first data being longer than a reproduction delay time that is determined based on a difference in time between a time of the reproduction request from the user and reception of the upper layer subsequent data, wherein said upper layer first data and said upper layer subsequent data are included in the same upper layer and are in anteroposterior relationship along the playing time axis of said reproduction contents.

13. The receiving apparatus according to claim 12, further comprising
a unit for making a transmission request for the upper layer subsequent data to the transmitting apparatus when performing the reproduction processing on the upper layer first data and the lower layer data.

14. The receiving apparatus according to claim 12,
further reproducing the low quality picture with only the lower layer data as an input, and
transmitting reproduction content quality information indicating quality of the picture to be reproduced to the transmitting apparatus.

15. The receiving apparatus according to claim 14, further comprising
a lower layer data length transmitting unit for transmitting a transmitted lower layer data reproduction time to the transmitting apparatus, the transmitted lower layer data reproduction time being a reproduction time of the lower layer data received previously, and wherein
if transmitted upper layer data transmitted by the upper layer first data transmitting unit and the upper layer subsequent data transmitting unit has a reproduction time shorter than the transmitted lower layer data reproduction time, the lower layer subsequent data transmitting unit transmits the upper layer subsequent data and corresponding lower layer subsequent data after the transmitting apparatus continues transmitting only the upper layer subsequent data and the transmitted upper layer data reproduction time becomes equal to the transmitted lower layer data reproduction time.

\* \* \* \* \*